(12) United States Patent
Destain et al.

(10) Patent No.: US 7,869,145 B2
(45) Date of Patent: Jan. 11, 2011

(54) SYSTEM AND METHOD FOR ILLUMINATING A TARGET

(75) Inventors: Patrick Rene Destain, Allen, TX (US); Terry Alan Bartlett, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 173 days.

(21) Appl. No.: 12/268,134

(22) Filed: Nov. 10, 2008

(65) Prior Publication Data

US 2010/0118540 A1 May 13, 2010

(51) Int. Cl.
*G02B 27/02* (2006.01)
*G02B 9/00* (2006.01)

(52) U.S. Cl. .................... 359/800; 359/651
(58) Field of Classification Search .............. 359/651, 359/798, 800
See application file for complete search history.

(56) References Cited

U.S. PATENT DOCUMENTS 2,637,242 A * 5/1953 Osterberg et al. ........... 359/716
2007/0152231 A1 7/2007 Destain

* cited by examiner

*Primary Examiner*—William C Choi
(74) *Attorney, Agent, or Firm*—Charles A. Brill; Wade James Brady, III; Frederick J. Telecky, Jr.

(57) ABSTRACT

According to one embodiment of the present invention, a system for illuminating a target includes a light source configured to emit one or more light beams with a first divergence. The system further includes a lens separated from the light source. The lens is configured to substantially satisfy the sine condition without removing spherical aberrations from the one or more light beams. The lens is further configured to receive the one or more light beams with the first divergence. The lens is further configured to change the first divergence of the one or more light beams to a second divergence. The second divergence is less than the first divergence. The second divergence is greater than zero. The lens is further configured to transmit the one or more light beams with the second divergence.

9 Claims, 3 Drawing Sheets

SYSTEM AND METHOD FOR ILLUMINATING A TARGET

TECHNICAL FIELD OF THE INVENTION

This invention relates generally to the field of optics and more specifically to a system and method for illuminating a target.

BACKGROUND OF THE INVENTION

In certain systems, light beams emitted from a light source pass through one or more lenses to illuminate a target. These systems, however, typically do not adequately preserve the etendue of the light source, yielding a deficient image.

Additionally, a collimator may be used in the systems to collimate the light beams. Certain collimators, however, increase the size of the system. As a result, the system may be inappropriate for certain applications, such as cell phones and projectors.

SUMMARY OF THE INVENTION

According to one embodiment of the present invention, a system for illuminating a target includes a light source configured to emit one or more light beams with a first divergence. The system further includes a lens separated from the light source. The lens is configured to substantially satisfy the sine condition without removing spherical aberrations from the one or more light beams. The lens is further configured to receive the one or more light beams with the first divergence. The lens is further configured to change the first divergence of the one or more light beams to a second divergence. The second divergence is less than the first divergence. The second divergence is greater than zero. The lens is further configured to transmit the one or more light beams with the second divergence.

Certain embodiments of the invention may provide one or more technical advantages. A technical advantage of some embodiments may be that the lens may reduce the divergence of the light beams, which may preserve the etendue of the light source. A technical advantage of other embodiments may be that the lens may be configured to substantially satisfy the sine condition without removing spherical aberrations from the light beams. As such, the etendue of the light source may be preserved even when the optical quality of the light beams is deficient. A technical advantage of other embodiments may be that a lens is separated from a light source. This separation may increase the efficiency and life time of the light source. A technical advantage of a further embodiment may be that a combiner may include a collimating lens with a single optically active surface. Thus, additional housing is not needed to hold the collimating lens, which may reduce the size, cost, and alignment sensitivity of the system.

Certain embodiments of the invention may include none, some, or all of the above technical advantages. One or more technical advantages may be readily apparent to one skilled in the art from the figures, descriptions, and claims included herein.

BRIEF DESCRIPTION OF THE DRAWINGS

For a more complete understanding of embodiments of the present invention and its features and advantages, reference is now made to the following description, taken in conjunction with the accompanying drawings, in which.

DETAILED DESCRIPTION OF EXAMPLE EMBODIMENTS OF THE INVENTION

Embodiments of the present invention and its advantages are best understood by referring to FIGS. 1A through 3 of the drawings, like numerals being used for like and corresponding parts of the various drawings.

Figure 1A:
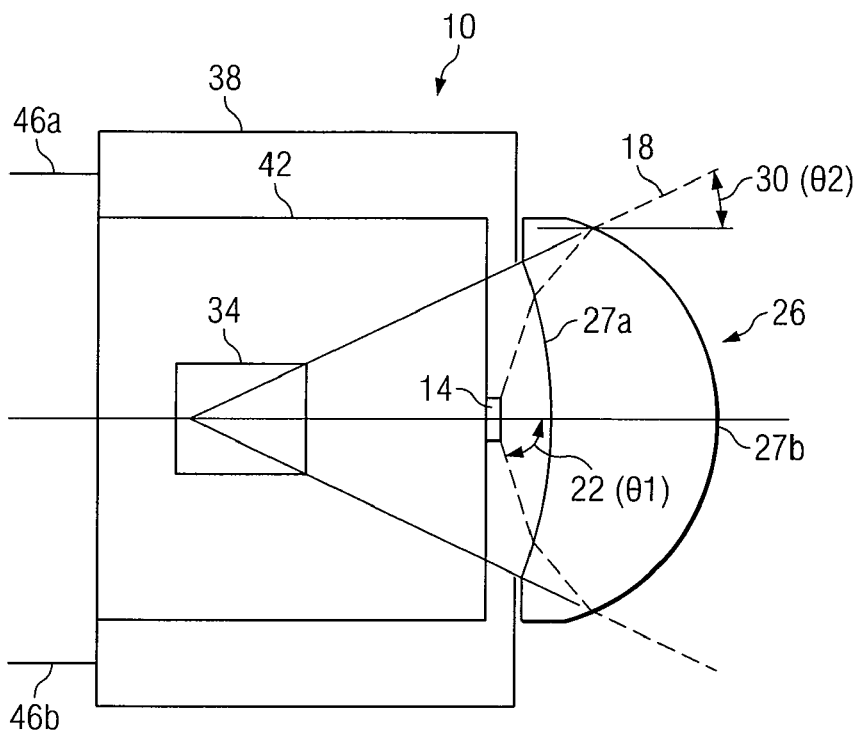
FIG. 1A illustrates an example of one embodiment of a system that may illuminate a target.

FIG. 1A illustrates an example of one embodiment of a system 10 that may illuminate a target. In the embodiment, system 10 includes a lens 26 that may be configured to reduce the divergence of one or more light beams 18 received from a light source 14. Reducing the divergence of light beams 18 may preserve the etendue of light source 14, enabling light beams 18 to provide a sharper image when illuminating a target. Additionally, lens 26 may be further configured to substantially satisfy the sine condition without removing spherical aberrations from light beams 18. In a further embodiment, lens 26 may be optically separated from light source 14, which may increase the efficiency and life time of light source 14.

According to the illustrated embodiment, system 10 includes light source 14, lens 26, packaging 38, heat sink 42, and electrical connectors 46 (46a, b). Light source 14 may be operable to emit light beams 18 comprising electromagnetic radiation of any suitable wavelength. In one embodiment, light beams 18 may include white light, red light, green light, blue light, or any other light having a suitable wavelength. In one embodiment, light source 14 may include a light emitting diode (LED), a light bulb, or any other suitable device that may emit light beams 18. For example, light source 14 may include an LED emitting light beams 18 of red light, green light, or blue light.

In one embodiment, light beams 18 may diverge as they are emitted from light source 14. According to the illustrated embodiment, light beams 18 include an initial angle of divergence 22 (labeled as "θ1" in FIGS. 1A and 1B). In one embodiment, initial angle of divergence 22 may be an angle greater than 30 degrees, and less than or equal to 90 degrees. For example, initial angle of divergence 22 may be an angle of 80 degrees for light beams 18 that diverge at an angle of 80 degrees.

Lens 26 has surfaces 27 (27a, b) and may be operable to receive light beams 18, and further operable to transmit the received light beams 18. In one embodiment, lens 26 may include any suitable optical device comprising any suitable material such as plastic, moldable glass, non-moldable glass, optical resin, and/or any other suitable optical material. In one embodiment, lens 26 may comprise glass with an index of refraction of 1.75 or greater; high index flint glass with an index of refraction between 1.80 and 1.85; or plastic with an index of refraction of 1.5 or greater. In certain embodiments, lens 26 may provide UV filtering and/or high thermal stability. In further embodiments, lens 26 may provide high coating efficiency for a wide angle of incidence (AOI) range. For example, lens 26 may provide high coating efficiency for an AOI that is between 0 and 47 degrees with respect to a normal at each point of a first surface 27a. As another example, lens 26 may provide high coating efficiency for an AOI that is between 0 and 61 degrees with respect to a normal at each point of a second surface 27b.

In one embodiment, lens 26 may be configured to reduce the divergence of light beams 18. For example, lens 26 may be a "powered" lens with a power of 1/f, where f refers to the focal length of lens 26. As another example, lens 26 may include curvature at either first surface 27a or second surface 27b, or at both surfaces 27a and 27b. For example, first surface 27a may be concave, and second surface 27b may be convex. As another example, the radius of curvature of lens 26 may be equal to at least half the diagonal diameter of light source 14. As a further example, the radius of curvature of lens 26 may be equal to between 2.5 times and 4 times the diagonal diameter of light source 14. In one embodiment, the power of lens 26, the curvature of lens 26, or both the power and the curvature, may configure lens 26 to transmit light beams 18 with a decreased divergence.

A decreased divergence of light beams 18 may refer to light beams 18 having less divergence when transmitted by lens 26 than when previously received by lens 26. According to the illustrated embodiment, light beams 18 include a second angle of divergence 30 (labeled as "θ2" in FIGS. 1A and 1B) after being transmitted by lens 26. In one embodiment, second angle of divergence 30 may be an angle greater than 0 degrees, and less than or equal to 30 degrees. For example, second angle of divergence 30 may be an angle of 25 degrees. In a further embodiment, second angle of divergence 30 may be any angle less than initial angle of divergence 22. For example, if initial angle of divergence 22 is an angle of 80 degrees, second angle of divergence 30 may be any angle less than 80 degrees, such as 31 degrees. As a result, lens 26 may transmit light beams 18 with a decreased divergence. In certain embodiments, such a reduced divergence may increase the collection efficiency of light beams 18 transmitted from lens 26.

In one embodiment, lens 26 may be configured to decrease the divergence of light beams 18 so as to preserve the etendue of light source 14. For example, lens 26 may be configured to decrease the divergence of light beams 18 so that the sine condition is met, preserving the etendue of light source 14. According to the sine condition:

$$\frac{\sin(\theta 1)}{\sin(\theta 2)} = \text{constant mathematical result}$$

where θ1 refers to the entering or initial angle of divergence 22 where θ2 refers to the exiting or second angle of divergence 30

In one embodiment, the sine condition may be met when an initial angle of divergence 22 (θ1) of light beams 18 being received at lens 26 and a second angle of divergence 30 (θ2) of light beams 18 being transmitted by lens 26 provide a constant mathematical result according to the above equation for sine condition. In one embodiment, a constant mathematical result may refer to any number that remains the same even when initial angle of divergence 22 and second angle of divergence 30 change. For example, a substantially constant mathematical result may include any number, such as 2.3, that remains the same for any combination of angles of both initial angle of divergence 22 and second angle of divergence 30. In a further embodiment, a constant mathematical result may refer to a number as low as 1.4.

In a further embodiment, the etendue of light source 14 may be preserved when the sine condition is substantially met. Accordingly, in one embodiment, lens 26 may be configured to substantially satisfy the sine condition:

$$\frac{\sin(\theta 1)}{\sin(\theta 2)} \sim \text{constant mathematical result}$$

Figure 1B:
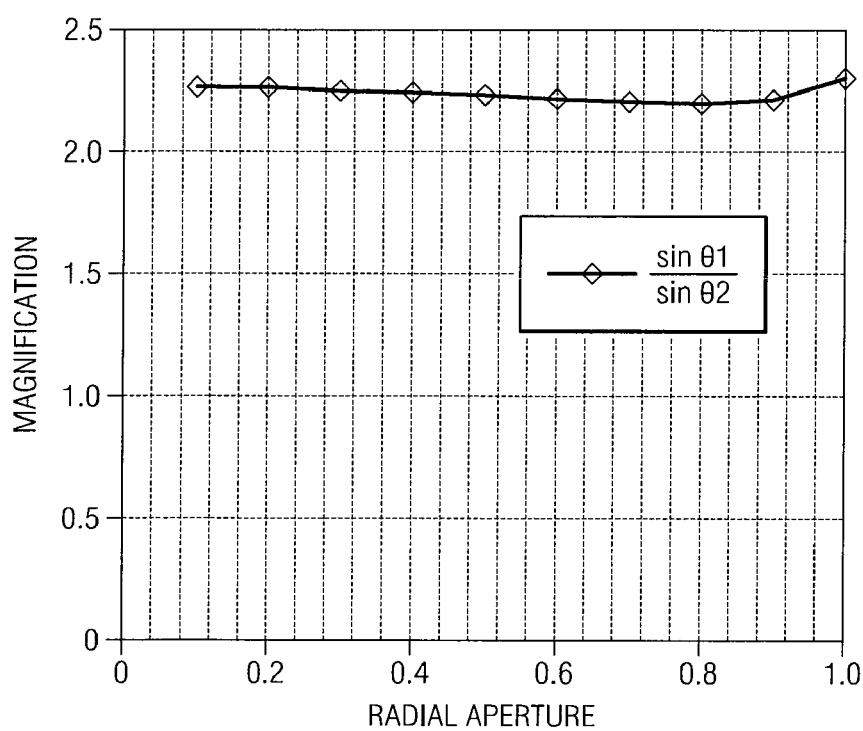
FIG. 1B is a graph illustrating the system of FIG. 1A substantially satisfying the sine condition.

In one embodiment, substantially satisfying the sine condition may refer to initial angle of divergence 22 (θ1) of light beams 18 being received at lens 26 and a second angle of divergence 30 (θ2) of light beams 18 being transmitted by lens 26 providing a substantially constant mathematical result. For example, the sine condition may be substantially met when the result produced by the above equation for sine condition only changes by plus or minus 5 percent. As another example, the sine condition may be substantially met when the result produced by the above equation for sine condition changes by plus or minus 5 to 25 percent, such as plus or minus 10 percent. FIG. 1B is a graph 80 that illustrates one embodiment of an initial angle of divergence 22 and second angle of divergence 30 of light beams 18 of FIG. 1A substantially satisfying the sine condition. According to the embodiment illustrated in FIG. 1B, the constant mathematical result is equal to 2.3. In one embodiment, the decrease in divergence of light beams 18 caused by the configuration of lens 26 of FIG. 1A substantially provides the constant mathematical result, thus substantially satisfying the sine condition.

As discussed above, in one embodiment, lens 26 may be configured to substantially satisfy the sine condition, thus preserving the etendue of light source 14. In a further embodiment, lens 26 may be configured to substantially satisfy the sine condition without decreasing spherical aberrations from light beams 18. For example, lens 26 may transmit light beams 18 with undercorrected spherical aberrations. As another example, lens 26 may transmit light beams 18 with overcorrected spherical aberrations. According to one embodiment, even though the spherical aberrations of light beams 18 may not be removed (or reduced), the spherical aberrations of light beams 18 may not affect the preservation of the etendue of light source 14. As a result, lens 26 may preserve the etendue of light source 14 even when the optical quality of light beams 18 is deficient. In a further embodiment, even though the spherical aberrations of light beams 18 may not be removed, light beams 18 may have no (or little) coma.

In another embodiment, lens 26 may be configured to preserve the etendue of light source 14, and also decrease spherical aberrations in light beams 18. For example, lens 26 may be configured in an aplanatic configuration. As such, in one embodiment, light beams 18 may have substantially no (or little) spherical aberration and substantially no (or little) coma. As another example, lens 26 may be configured in a traditional Abbe condition. As such, in one embodiment, light beams 18 may satisfy the sine condition, and may have substantially no (or little) spherical aberration and substantially no (or little) coma. Accordingly, the etendue of light source 14 may be preserved, and light beams 18 may provide a sharper image when used to create an image on a target.

In one embodiment, lens 26 may be further configured to preserve the etendue of light source 14 by manipulating a virtual image 34. Virtual image 34 may refer to a virtual image of light source 14 as seen through lens 26. In one embodiment, lens 26 may be configured to magnify the size of virtual image 34. For example, the magnification provided by lens 26 may increase the size of virtual image 34 as compared to the size of light source 14. In particular, if lens 26 is configured to provide a magnification of, for example, 2.2, the size of virtual image 34 may be 2.2 times bigger than the size of light source 14. In one embodiment, the magnification of lens 26 may be substantially equal to the index of refraction of lens 26. In a further embodiment, lens 26 may be further configured to cause virtual image 34 to appear displaced from the actual location of light source 14.

By causing such manipulations of virtual image 34, lens 26 may, in one embodiment, cause light beams 18 to appear to diverge from each other at one or more locations inside virtual image 34. For example, if a path of each light beam 18 with an angle of divergence 30 was traced backwards into system 10, light beams 18 may appear to intersect with each other at a location inside of virtual image 34. As a result of this intersection inside of virtual image 34, the etendue of light source 14 may be preserved. In a further embodiment, the light beams 18 may not appear to diverge from each other from the exact same point inside of virtual image 34.

In another embodiment, lens 26 may be separated from, that is, not in contact with light source 14. For example, system 10 may include a gap between light source 14 and surface 27a of lens 26. As such, light source 14 and surface 27a of lens 26 may be optically separated from each other. In one embodiment, the separation between lens 26 and light source 14 may result in light source 14 being more efficient and having a longer lifetime. In a further embodiment, the separation between lens 26 and light source 14 may be filled with an index matching gel. For example, the gel may have an index of refraction between 1.4 and 1.7. In another embodiment, the separation between lens 26 and light source 14 may be filled with any other suitable medium.

According to the illustrated embodiment, system 10 further includes packaging 38, heat sink 42, and electrical connectors 46. Packaging 38 may be operable to enclose one or more elements of system 10 into a single device. For example, packaging 38 may be operable to enclose light source 14 and lens 26 in a single integrated packaging while keeping light source 14 and lens 26 optically separated from each other. As a result, system 10 may not need additional mechanical housing, reducing the cost of such a system. In one embodiment, packaging 38 may have any suitable shape and comprise any suitable material, such as plastic, metal, and/or any other suitable material.

Heat sink 42 may be operable to dissipate heat generated by light source 14. In one embodiment, heat sink 42 may include any suitable heat transfer system. Electrical connectors 46 may be operable to allow system 10 to receive electricity from an electrical source. In one embodiment, electrical connectors 46 may include electrical pins, electrical wires, any suitable device for conducting electricity, or any other suitable device operable to allow system 10 to receive electricity from an electrical source.

TABLE 1 illustrates a prescription list for one embodiment of system 10 of FIG. 1A. According to Table 1, "SN" refers to a number of a present surface of system 10 (i.e., SN 1 refers to light source 14, SN 2 refers to surface 27a of lens 26, and SN 3 refers to surface 27b of lens 26); "RAD" refers to the radius of curvature (in millimeters) of the present surface; "THICKNESS" refers to the distance (in millimeters) between the present surface and the next surface; "MEDIUM" refers to the medium that light beams 18 pass through after the present surface; and "COMMENTS" refer to any additional comments about the present surface.

TABLE 1

| SN | Rad | Thickness | Medium | Comments |
| --- | --- | --- | --- | --- |
| 1 | Infinity | 3.4211 | Air | 4 × 3 mm2 LED |
| 2 | −12.906 | 5.801 | S-LAH79 (type of glass) | concave surface |
| 3 | −8.7877 | 0 | Air | convex surface |

Modifications, additions, or omissions may be made to system 10 without departing from the scope of the invention. The components of system 10 may be integrated or separated. Moreover, the operations of system 10 may be performed by more, fewer, or other components. For example, the operations of lens 26 may be performed by more than one component. As another example, there may be a window between light source 14 and lens 26. As used in this document, "each" refers to each member of a set or each member of a subset of a set.

Figure 2:
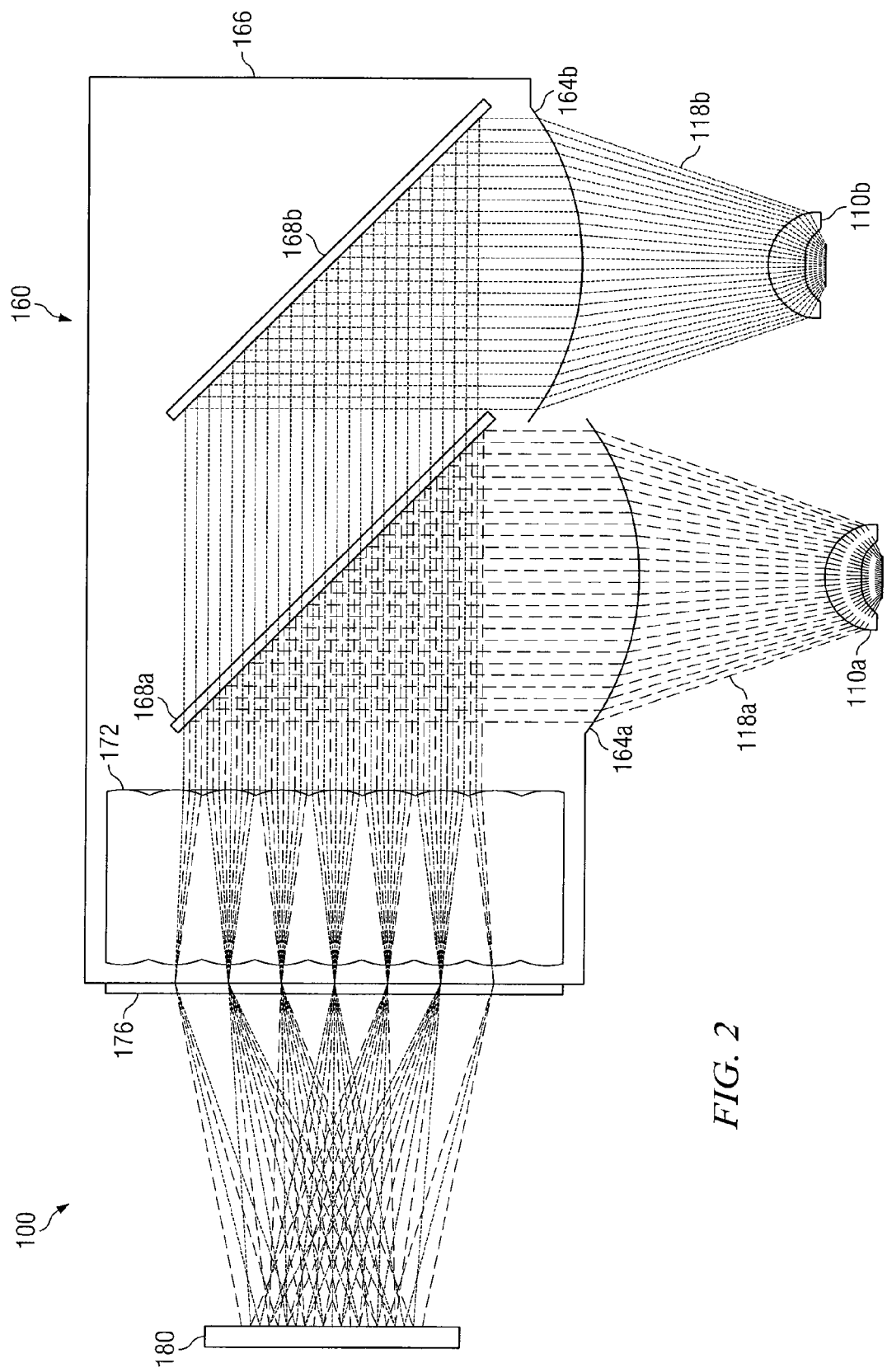
FIG. 2 illustrates an example of one embodiment of a system that may illuminate a target.

FIG. 2 illustrates an example of one embodiment of a system 100 that may illuminate a target 180. In the embodiment, system 100 includes a combiner 160 with one or more collimating lenses 164. By including collimating lenses 164 in combiner 160, one or more light beams 118 may be collimated without system 100 needing additional housing for collimating lenses 164. Thus, the size of system 100 may be reduced.

According to the illustrated embodiment, system 100 includes one or more light systems 110 (110a, b), combiner 160, collimating lenses 164 (164a, b), and target 180. Light systems 110 (110a, b) may be operable to emit light beams 118 (118a, b) for transmission to collimating lenses 164. In one embodiment, each of light systems 110 of FIG. 2 is substantially similar to system 10 of FIG. 1A, and light beams 118 of FIG. 2 are substantially similar to light beams 18 of FIG. 1A.

According to the illustrated embodiment, light system 110a emits light beams 118a and light system 110b emits light beams 118b. In one embodiment, light beams 118a may include a different wavelength than light beams 118b. For example, light beams 118a may be green light, and light beams 118b may be blue light. Although FIG. 2 illustrates system 100 as including two light systems 110, in particular embodiments, system 100 may include only one light system 110 or more than two light systems 110. For example, system 100 may include three light systems 110: one for emitting light beams 118 of green light, one for emitting light beams 118 of blue light, and one emitting light beams 118 of red light.

Combiner 160 may refer to any suitable device for superimposing light beams 118 onto target 180. According to the illustrated embodiment, combiner 160 includes collimating lenses 164, combiner packaging 166, one or more films 168 (168a, b), a homogenizer 172, and a field lens 176.

Collimating lenses 164 (164a, b) may be operable to collimate light beams 118. Collimation may refer to reducing the divergence of light beams 118 to substantially zero. For example, after being collimated, light beams 118 may be substantially parallel to each other. In one embodiment, collimating lenses 164 may include any suitable optical element, and may comprise any suitable material, glass or plastic. In a further embodiment, collimating lenses 164 may have only one surface that is optically active. For example, only the single optically active surface of collimating lenses 164 may be needed in order to collimate light beams 118. A collimating lens 164 with only one optically active surface, in one embodiment, may be more easily incorporated into combiner 160.

Combiner packaging 166 may be operable to enclose one or more elements of combiner 160 into a single device. In one embodiment, combiner packaging 166 may have any suitable shape and comprise any suitable material, such as plastic, metal, or any other suitable material. According to one embodiment, combiner packaging 166 may be configured to couple one or more elements of combiner 160 together in order to superimpose light beams 118 onto target 180. According to the illustrated embodiment, combiner packaging 166 may be further operable to couple collimating lenses 164 in combiner 160.

Films 168 may be operable to reflect light beams 118 of a certain wavelength, and allow light beams 118 of other wavelengths to pass through films 168. In one embodiment, films 168 may include dichroic films or any other suitable film for reflecting certain wavelengths and passing other wavelengths. According to the illustrated embodiment, system 100 includes film 168a and film 168b. In one embodiment, film 168a may reflect light beams 118 of a certain wavelength, and film 168b may reflect light beams 118 of a different wavelength. For example, film 168a may reflect light beams 118a of blue light, and film 168b may reflect light beams 118b of green light. Thus, films 168 may reflect respective light beams 118 towards homogenizer 172, but allow other light beams 118 to pass through. Accordingly, in one embodiment, light beam 118b may be reflected towards homogenizer 172 by film 168b, and light beam 118b may also pass through film 168a before reaching homogenizer 172.

Although the illustrated embodiment includes two films 168, system 100, in particular embodiments, may include one film 168 or more than two films 168. For example, in one embodiment, system 100 may include a third film 168c (not shown) for reflecting light beams 118c (not shown). In such an embodiment, light beams 118c may include, for example, red light. In a further embodiment, system 100 may only include two films 168, but may still include additional light beams 118c. In such an embodiment, light beams 118c of, for example, red light may be emitted directly at homogenizer 172. Accordingly, light beams 118c of red light may not be reflected by either films 168a or 168b, but instead, may pass through both films 168a and 168b in order to reach homogenizer 172. In a further embodiment, film 168 may include a polarizing film that may reflect light beams 118 of a certain polarization state, and allow light beams 18 with other polarization states to pass through.

Homogenizer 172 may be operable to homogenize light beams 118. In one embodiment, homogenizer 172 may include a Fly Eye Array (FEA) or any other suitable device. In one embodiment, homogenizing light beams 118 using homogenizer 172 may preserve the etendue of light systems 110. Field lens 176 may be operable to superimpose light beams 118 onto target 180 in order to create an image. In one embodiment, field lens 176 may include any suitable optical element of any suitable material, such as glass, plastic, or any other suitable material. In one embodiment, field lens 176 may receive light beams 118 of various colors, for example, red, green, and blue, and reimage light beams 118 in the same focal on target 180.

Target 180 may refer to any suitable surface illuminated by light beams 118. In one embodiment, target 180 may include a film, a screen, skin (e.g., the skin of a person's hand), a digital micro-mirror device (DMD), a liquid crystal display (LCD), a liquid crystal on silicon (LCOS), or any other surface suitable for illumination by light beams 118. For example, light beams 118 emitted from light source 114 may illuminate target 180 including a DMD, and target 180 may project an image onto a screen Although FIG. 2 illustrates combiner 160 including collimating lenses 164, in particular embodiments, combiner 160 may not include collimating lenses 164. For example, collimating lenses 164 may be separate from combiner 160. As a result, the collimation of light beams 118 may occur somewhere other than combiner 160. According to one embodiment, the collimation of light beams 118 may occur in a housing coupled to a light system, such as light system 110. For example, each of light systems 110 of FIG. 2 may further include a housing with collimating lens 164. Accordingly, light systems 110 may collimate light beams 118 prior to light beams 118 entering combiner 160.

In one embodiment, because collimating lenses 164 may not be included in combiner 160, collimating lenses 164 may include two or more optically active surfaces. Furthermore, because collimating lenses 164 may receive light beams 118 with substantially no spherical aberrations or coma (as is discussed in FIG. 1A), collimating lenses 164 may not have to correct light beams 118 for any spherical aberrations or coma. As such, in one embodiment, collimating lenses 164 may include any type of material, any type of focal length, and/or any amount of magnification. As such, system 100 may be used for many different applications.

Figure 3:
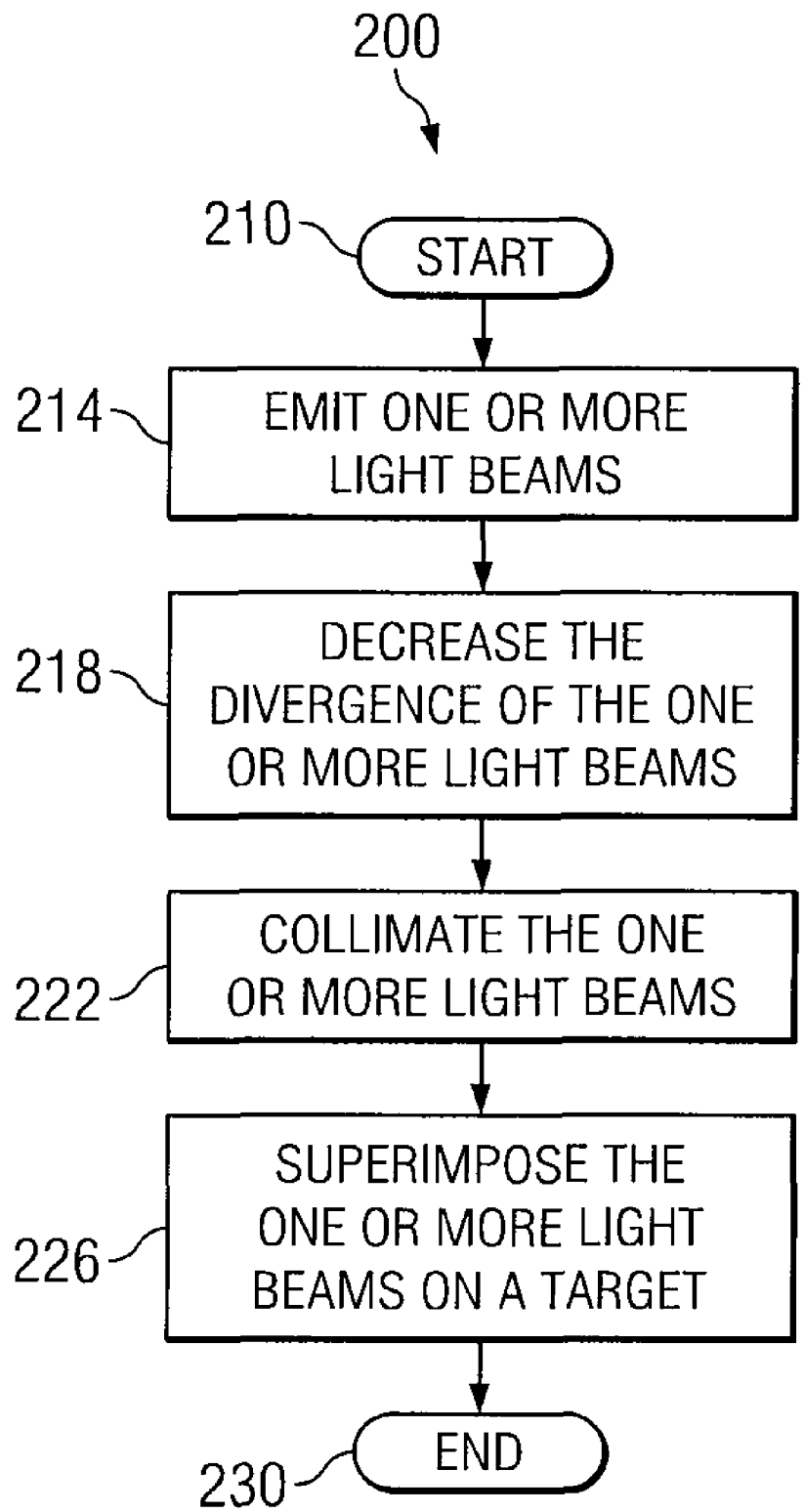
FIG. 3 illustrates an example of a method for illuminating a target that may be used with the system of FIG. 1A and/or the system of FIG. 2.

FIG. 3 illustrates an example of a method for illuminating a target that may be used with system 10 of FIG. 1A and/or system 100 of FIG. 2. The method begins at step 210. At step 214, one or more light beams are emitted. In one embodiment, the light beams may be emitted from a light source. In a further embodiment, the emitted light beams may diverge after being emitted. For example, the emitted light beams may have an angle of divergence that is greater than 30 degrees but less than or equal to 90 degrees.

The method then moves to step 218, where the divergence of the one or more light beams is decreased. In one embodiment, reducing the divergence of the light beams may cause the angle of divergence to be greater than 0 degrees but less than or equal to 30 degrees. For example, the angle of divergence may be 30 degrees. In one embodiment, the divergence of the light beams may be decreased using a lens. In another embodiment, the lens may be configured to preserve the etendue of a light source. For example, the lens may be configured to receive and transmit light beams so as to substantially satisfy the sine condition. As another example, the lens may be configured to substantially satisfy the sine condition without reducing spherical aberrations, and to transmit the light beams with no (or little) coma. As a further example, the lens may be configured to manipulate a virtual image so that the light beams appear to intersect inside of the virtual image. In a further embodiment, the lens may be configured to remove aberrations in the light beams. For example, the lens may be configured with an Abbe configuration. As a further example, the lens may be configured with an aplanatic configuration. In an additional embodiment, the lens may be separated from the light source emitting the light beams.

At step 222, the one or more light beams are collimated. In one embodiment, the light beams may be collimated using collimating lenses included in a combiner. In such embodiment, the collimating lenses may have only a single optically active surface. In a further embodiment, the light beams may be collimated using collimating lenses that are separate from the combiner. For example, the collimating lenses may be included in a housing coupled to a light system.

The method then moves to step 226, where the one or more light beams are superimposed on a target. In one embodiment, superimposing light beams on the target may include reflecting light beams of a certain wavelength using one or more films, and allowing light beams of other wavelengths to pass through the films. In a further embodiment, superimposing light beams on the target may further include homogenizing the light beams prior to superimposing the light beams on the target using a field lens. After step 226, the method ends at step 230.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A system for illuminating a target, comprising:
a light source configured to emit one or more light beams with a first divergence; and
a lens separated from the light source, the lens configured to substantially satisfy $$\frac{\sin(\theta 1)}{\sin(\theta 2)} \sim \text{constant},$$

where $\theta 1$ is an entering angle of divergence and $\theta 2$ is an exiting angle of divergence, without removing spherical aberrations from the one or more light beams, the lens further configured to:
receive the one or more light beams with the first divergence;
change the first divergence of the one or more light beams to a second divergence, the second divergence being less than the first divergence, the second divergence being greater than zero; and
transmit the one or more light beams with the second divergence.

2. The system of claim 1, wherein the lens is further configured to manipulate a virtual image so that the one or more light beams appear to diverge from each other at one or more locations inside the virtual image.

3. The system of claim 1, further comprising:
a collimator configured to:
receive the one or more light beams with the second divergence, and
collimate the one or more light beams; and
a combiner coupled to the collimator and configured to superimpose the one or more collimated light beams on a target.

4. The system of claim 1, further comprising:
a collimator having only one optically active surface and configured to:
receive the one or more light beams with the second divergence; and
collimate the one or more light beams.

5. The system of claim 1, further comprising:
a packaging configured to couple the light source and the lens;
a housing configured to couple to the packaging; and
a collimator coupled to the housing and configured to:
receive the one or more light beams with the second divergence; and
collimate the one or more light beams.

6. The system of claim 5, further comprising a combiner configured to superimpose the one or more collimated light beams on a target, the combiner being separated from the housing and the collimator.

7. The system of claim 1, wherein the second divergence is substantially equal to 30 degrees.

8. The system of claim 1, wherein a radius of curvature of the lens is equal to at least half a diagonal diameter of the light source.

9. The system of claim 1, further comprising one or more dichroic films configured to:
reject the one or more collimated light beams having a certain wavelength; and
allow the one or more collimated light beams having a wavelength different from the certain wavelength to pass through.

* * * * *